Patented Sept. 7, 1943

2,329,023

UNITED STATES PATENT OFFICE 2,329,023

DYESTUFF INTERMEDIATES

Alexander J. Wuertz, Wilmington, Del., and Hans B. Gottlieb, Pitman, N. J., assignors to E. I. du Pont de Nemours & Company, Wilmington, Del., a corporation of Delaware No Drawing. Application November 27, 1941, Serial No. 420,689

4 Claims. (Cl. 260—381)

This invention relates to new dye intermediates and to a process for preparing the same. The invention relates more particularly to the preparation of 1-amino-6-chloro-7-methyl-anthraquinone and 1-amino-6-methyl-7-chloroanthraquinones of the general formula

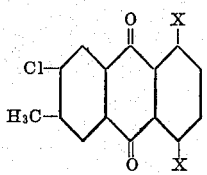

in which one X stands for the radical —$NH_2$ and the second X stands for hydrogen.

The object of the invention is to produce new intermediates of the anthraquinone series which are useful in the preparation of vat dyes, anthraquinone acid wool dyes, dyes for artificial fibers such as nylon, cellulose acetate and regenerated cellulose and in the preparation of pigments.

These new dye intermediates may be produced by the nitration of 3-methyl-2-anthraquinone sulfonic acid, replacement of the sulfonic acid group by halogen and reduction of the nitro group. The general manipulative steps employed in producing these new dye intermediates are each one in themselves known to those skilled in the art, and various modifications may be made in the specific process as hereinafter defined without departing from the spirit of applicants' invention.

The following examples are given to illustrate the preferred method for producing these new dye intermediates. The parts used are by weight.

Example 1

200 parts of 3-methyl-2-anthraquinone sulfonic acid sodium salt are added to 1520 parts of 95.6% sulfuric acid. There are then added to the mass under agitation 136.4 parts of mixed acid containing 32.4% nitric acid and 67.6% sulfuric acid. The addition of the mixed acid is made over the period of one-half hour while the temperature is allowed to rise to 55° C. The temperature of the mass is then maintained at 55° C. for 15 minutes then raised to 70–75° C. and held for 4.5 hours, after which the mass is allowed to cool to 20° C. and then filtered. The filter cake is washed with 280 parts of 73% sulfuric acid.

The filter cake as obtained above which is insoluble in 73% sulfuric acid and is essentially 1-nitro-6-sulfo-7-methyl-anthraquinone is suspended in 6000 parts of water. 870 parts of 80% sulfuric acid are then added and while the sulfuric acid suspension is maintained under agitation at 98° C. to 102° C., a solution of 100 parts of sodium chlorate and 100 parts of sodium chloride in 700 parts of water is run in over a period of 5 hours. The precipitated nitro-2-chloro-3-methyl-anthraquinone is filtered off, washed acid free and again slurried in 2500 parts of water. To this slurry there is added a concentrated solution of 300 parts of sodium sulfide ($Na_2S \cdot 9H_2O$) and the suspension is brought to a boil over a period of 45 minutes. The resulting amino-compound is filtered off, washed free from alkali with water and dried. The resulting product which is substantially pure 1-amino-6-chloro-7-methyl-anthraquinone is an orange red powder having a melting point of 238.4° C. This product analyzes to 12.77% chlorine and 4.72% nitrogen.

Example 2

The filtrate from the nitration of the 3-methyl-antraquinone sulfonic acid sodium salt containing the fraction which is soluble in the nitration acid is subjected to a chlorination in the same manner as above described for the sulfuric acid insoluble fraction. After diluting the filtrate with 6500 parts of water, the chlorination is effected at 98.2° C. with a solution of 110 parts of sodium chlorate and 110 parts of sodium chloride in 700 parts of water which is added to the acid solution over a period of 5 hours. The resulting suspension is filtered and the precipitate is washed acid free with water and again slurried in 2500 parts of water and reduced by adding a solution of 300 parts of sodium sulfide ($Na_2S \cdot 9H_2O$) in 900 parts of water to the slurry. After maintaining the suspension at the boil for 45 minutes reduction is completed. The suspension is then filtered and the filter cake washed free from alkali with water and dried. The resulting product which is essentially 1-amino-6-methyl-7-chloroanthraquinone probably containing some 1-amino-6-chloro-7-methylanthraquinone has a melting point of 235.5° C. On analysis it contains 12.93% chlorine and 4.97% nitrogen.

As mentioned above, the nitration, reduction and chlorination steps may be carried out under a variety of conditions. Other reducing agents such as stannous chloride may be substituted for the sodium sulfide employed in the above examples.

The methyl - chloro - alpha - aminoanthraquinones as produced above are valuable intermediates for the preparation of vat dyestuffs. On condensation with 1-benzoylamino-5-chloro-anthraquinone and carbazolation of the resulting condensation product dyes are obtained which exhibit superior fastness properties over the corresponding dyes which do not contain the chloro- and methyl-substituents.

The 2-methyl-3-anthraquinone sulfonic acid employed as the starting material in the preparation of these new intermediates may be produced as more particularly described in copending application (Ser. No. 420,688), filed of even date herewith. According to that process 3'-methyl-4'-chloro-2-benzoyl-1-benzoic acid is subjected to the action of sodium sulfide in aqueous solution to convert it to the 3'-methyl-4'-sulfo-2-benzoylbenzoic acid, which compound is in turn ring closed in concentrated sulfuric acid giving 2-methyl-3-anthraquinone sulfonic acid.

We claim:
1. The amino-chloro-methyl-anthraquinone of the following general formula:

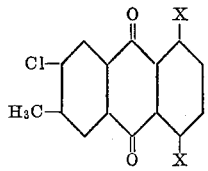

wherein one X stands for the radical —$NH_2$ and the second X stands for hydrogen.
2. 1-amino-6-methyl-7-chloroanthraquinone.
3. 1-amino-6-chloro-7-methyl-anthraquinone.
4. The process for preparing 1-amino-6-chloro-7-methyl-anthraquinone which comprises subjecting 2-methyl-3-anthraquinone sulfonic acid to a mono-nitration in concentrated sulfuric acid, filtering the resulting nitration mass, subjecting the product obtained as the filter cap to halogenation to effect replacement of the sulfonic acid group by halogen, and finally reducing the resulting nitro compound to the corresponding amine.

ALEXANDER J. WUERTZ.
HANS B. GOTTLIEB.

CERTIFICATE OF CORRECTION.

Patent No. 2,329,023.  September 7, 1943.

ALEXANDER J. WUERTZ, ET AL.

It is hereby certified that error appears in the printed specification of the above numbered patent requiring correction as follows: Page 1, second column, line 27, for "antraquinone" read --anthraquinone--; page 2, second column, line 20, claim 4, for the word "cap" read --cake--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.